US005530220A

United States Patent [19]

Tatham

[11] Patent Number: 5,530,220

[45] Date of Patent: Jun. 25, 1996

[54] PLASMA TORCH ARC TRANSFER CIRCUIT

[75] Inventor: David A. Tatham, Enfield, N.H.

[73] Assignee: Thermal Dynamics Corporation, West Lebanon, N.H.

[21] Appl. No.: 225,881

[22] Filed: Apr. 11, 1994

[51] Int. Cl.[6] .......... B23K 10/00

[52] U.S. Cl. .......... 219/121.57; 219/121.54; 219/130.4; 219/121.39

[58] Field of Search .......... 219/121.54, 130.4, 219/121.57, 121.39, 130.1, 130.51

[56] References Cited

U.S. PATENT DOCUMENTS 3,869,593 3/1975 New et al. .......... 219/121 P
4,142,089 2/1979 Lau et al. .......... 219/121 P
4,397,147 8/1983 Turchi .......... 60/202
4,598,191 7/1986 Marhic et al. .......... 219/121 PW
4,678,888 7/1987 Camacho et al. .......... 219/121 PW
4,800,716 1/1989 Smith et al. .......... 60/203.1
4,885,455 12/1989 Schultz et al. .......... 219/121.46
4,906,811 3/1990 Buil .......... 219/121.59
4,943,699 7/1990 Thommes .......... 219/121.57
5,086,205 2/1992 Thommes .......... 219/121.54
5,170,030 12/1992 Solley et al. .......... 219/121.54
5,189,277 2/1993 Boisvert et al. .......... 219/121.54
5,227,603 7/1993 Doolette et al. .......... 219/121.59
5,416,297 5/1995 Luo et al. .......... 219/121.57

FOREIGN PATENT DOCUMENTS

436021A1 7/1991 European Pat. Off..

*Primary Examiner*—Mark H. Paschall
*Attorney, Agent, or Firm*—Senniger, Powers, Leavitt & Roedel

[57] ABSTRACT

An electronic circuit for a plasma arc torch that initiates the transfer of a pilot arc into an operating arc before operating current is sensed in a workpiece. The electronic circuit includes a power circuit output inductor, and a pilot circuit having a disconnect in series with the pilot electrode of the plasma torch. An oscillator is coupled to the disconnect to periodically open-circuit the pilot circuit before current is detected in the workpiece by a current sensor. The periodic cessation of current caused by the disconnect causes the output inductor to create a voltage spike that assists in the transfer by attempting to establish the operating arc between the electrode and the workpiece. Optionally, a pilot inductor in the pilot circuit provides transitory power to sustain the pilot arc during the time the pilot current source is ceased, should arc transfer not occur. If transfer occurs, the pilot circuit is kept open-circuited, else the pilot circuit is closed until current is sensed in the workpiece indicative of arc transfer or the oscillator again open-circuits the pilot regulator disconnect.

18 Claims, 3 Drawing Sheets

PLASMA TORCH ARC TRANSFER CIRCUIT

BACKGROUND OF THE INVENTION

The present invention relates to plasma torches and, in particular, is directed to a plasma torch circuit having an improved pilot arc to operating arc transfer circuit.

Plasma torches, also known as plasma arc torches, are well known in the art for their ability to cut and weld metal workpieces. Plasma torches operate by directing a plasma consisting of an ionized cloud of gas towards a workpiece. Such an example of a conventional single gas type plasma torch is disclosed in U.S. Pat. No. 3,813,510 to Hatch, and assigned to the assignee of the present invention, the patent of which is specifically incorporated herein by reference. Other patents disclosing plasma torches and specifically incorporated herein by reference are U.S. Pat. Nos. 4,225,769; 4,663,512; and 4,663,515.

As these patents illustrate, plasma torches operate by feeding an ionizable gas, such as nitrogen, through channels within the torch to the front end of the torch. The gas then may be caused to swirl in front of the end of a typically negatively charged electrode positioned at the front end of the torch. A tip that is positioned adjacent the end of the electrode and spaced a predetermined distance therefrom, has a sufficiently high voltage applied thereto to cause a spark to traverse the gap between the electrode and the tip to thereby complete an electrical circuit. This spark starts the pilot arc which is the flow of DC current.

The pilot arc consists of at least two parts. The first part is the actual current that flows from the electrode to the tip and which extends a distance from the tip and electrode by the movement of the swirling, ionized gas. The second part is a cloud of ionized gas that surrounds the actual current. The ionized gas cloud also extends from the tip and electrode, but at a distance further than the actual current. Typically, a DC current is supplied to the tip and electrode to maintain the pilot arc. The DC current may optionally be pulsed.

In order for the plasma torch to operate, a main or cutting arc must be established between the electrode and a workpiece. The process of switching the pilot arc from between the tip and the electrode into the main arc from between the electrode and the workpiece is known as transfer of the arc. In order to transfer the arc, a current has to flow between the electrode and the workpiece. Once this is accomplished the current between the electrode and the tip is generally stopped. A power circuit thus has one end that is coupled to the workpiece in order for the current to flow between the workpiece and the electrode. The height of the electrode and the tip to the workpiece is one of the factors effecting the ability of the plasma torch to achieve transfer. It is the cloud of ionized gas through which the transfer is initiated. Thus, current will conduct via the ionized cloud before the actual pilot current contacts the workpiece.

The pilot current is a low impedance path. On the other hand, prior to transfer the main or cutting current path is a higher impedance path because the ionized cloud acts like a gas tube (neon bulb) or a zener diode in that it takes a certain level of voltage across the distance between the electrode and the workpiece before conduction of current. The greater the distance between the electrode and the workpiece, the higher the impedance. However, once this breakdown voltage is reached, current flows and completes the path for transfer.

In the prior art, once transfer is achieved and current begins to flow in the workpiece, a current sensor open circuits the pilot arc current circuit. The current is then supplied between the electrode and the workpiece to maintain the established main arc. However, should the main arc not be established even though current has been sensed in the workpiece, it is necessary to reinitiate a pilot current. This redemand of current for the pilot arc and the extinguishment of the main arc current is hard on the torch and torch parts, increasing wear and tear, and reducing the overall life of the torch consumable parts.

Typical gas plasma torches include pilot arc circuits that provide a 5–40 amperage pilot arc current at 100–200 volts across the electrode to tip gap. In a typical plasma torch the typical components achieve an approximately ¼" transfer distance. The greater the transfer distance the more suited the plasma torch is for automatic applications such as robotic welding and cutting. Furthermore, the greater the transfer height, the easier the plasma torch is to use, as the operator does not need to be as precise in positioning the torch adjacent the workpiece.

In traditional prior art plasma torch electrical circuits, there is a power supply for the pilot arc and a power supply for the main arc. Thus, in order to achieve a greater transfer distance, the amperage and voltage for the pilot circuit could be increased. However, increasing the voltage and amperage to a level where a greater transfer distance is achieved could create other problems.

Thus, there remains a need for an easy to use plasma arc torch that achieves a greater transfer height without utilizing typically necessary heavy, lossy circuit elements such as inductors, resistors or separate power sources.

It is an object of the present invention to provide a plasma arc transfer circuit that is proactive rather than reactive in establishing an operating arc in a plasma arc torch.

It is another object of the present invention to increase the transfer height in a plasma torch without significantly increasing the power requirement.

It is yet another object of the present invention to utilize a power circuit which includes a single power source that powers both the pilot arc and the main arc and that also increases the transfer height.

It is still another object of the present invention to provide a plasma arc transfer circuit that allows a plasma arc torch to adapt to robotic or mechanized plasma torch applications as well as everyday manual operations.

SUMMARY OF THE INVENTION

In accordance with the above objects, the present invention is an electronic circuit for a plasma arc torch that attempts to initiate arc transfer once the plasma torch begins operation. Instead of sensing for current flow in the workpiece indicative of an operating arc, and thereafter generating a signal to shut off the pilot arc power source as in the prior art, the present circuit ceases current flow from the power source to the pilot electrode after the pilot arc is established. During the period that the power source does not supply power to the pilot electrode, a large, transient voltage appears between the workpiece and the torch electrode that establishes the operating arc.

During the interval when the power source is open-circuited to the pilot electrode, the pilot arc does not completely extinguish. A transient current is supplied between the electrodes to transitorily maintain the pilot arc.

If transfer occurs, a current sensor detects current flow in the workpiece and generates a signal that allows the pilot arc to extinguish and the operating arc to be maintained. Therefore, should establishment of the operating arc be unsuccessful, there is no need for a high frequency start-up for the pilot arc. In this manner, transfer heights of over ½" are obtainable.

In one form thereof, the present invention is an electronic circuit for a plasma arc torch for transferring an established pilot arc to an operating arc. The circuit includes an oscillator that provides a periodic signal to a switch or disconnect that is interposed between the power source and the pilot electrode. The oscillator periodically actuates the pilot current disconnect to open-circuit the power source from the pilot electrode. A pilot current source provides a transitory pilot current to the pilot electrode when the power source is open-circuited from the pilot electrode. The oscillator actuates the disconnect into the open-circuit position for an interval that is shorter than a maximum capacity of the pilot current source to sustain the pilot arc while the pilot current circuit is open-circuited.

Furthermore, the present plasma torch circuit is able to create a transitory sustaining current for the pilot arc should transfer not occur during the interval that the pilot current is ceased from the power source. In this manner, there is no need for a high frequency start-up of the pilot arc when pilot current is again caused to flow to the pilot electrode. This would occur when transfer is not achieved.

In one form thereof, the above features are enhanced by providing a pilot current source, such as an inductor, that supplies a transitory current to the pilot electrode during the time interval that the power source is open-circuited from the pilot electrode.

Thus, during each attempt at arc transfer, the pilot arc will not completely extinguish so that if the arc does not transfer, there is no need for a high frequency restart of the pilot arc. This is particularly useful in automated applications since valuable time is saved in restarting the pilot arc should arc transfer not occur during start-up or the operating arc is extinguished while the plasma torch is on.

This also reduces the amount of EMI that would normally be caused by the pilot spark upon reinitiation of the pilot arc, since there is no re-initiation.

Only when transfer of the pilot arc has been achieved does the pilot current cease. Otherwise, the oscillator keeps providing a signal to the disconnect until transfer does occur.

The present invention also includes a method of transferring a pilot arc previously established between a pilot electrode and a torch electrode of a plasma arc torch to an operating arc between the torch electrode and a workpiece. The first step is to periodically cease the pilot current supplied from a current source by an oscillator coupled to a disconnect circuit interposed between the pilot electrode and the current source circuit to cause an output inductor in the current source circuit to develop an induced voltage between the torch electrode and the workpiece to attempt to initiate arc transfer. This is followed by the step of continuously sensing for current in the workpiece indicative of arc transfer by a current sensor coupled between the workpiece and the current source circuit, then providing a signal to the disconnect circuit when the current sensor senses current in the workpiece indicative of arc transfer to cause the disconnect to either maintain the cessation of pilot current or to cease the pilot current.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE PREFERRED EMBODIMENT

Prior Art

Figure 1:
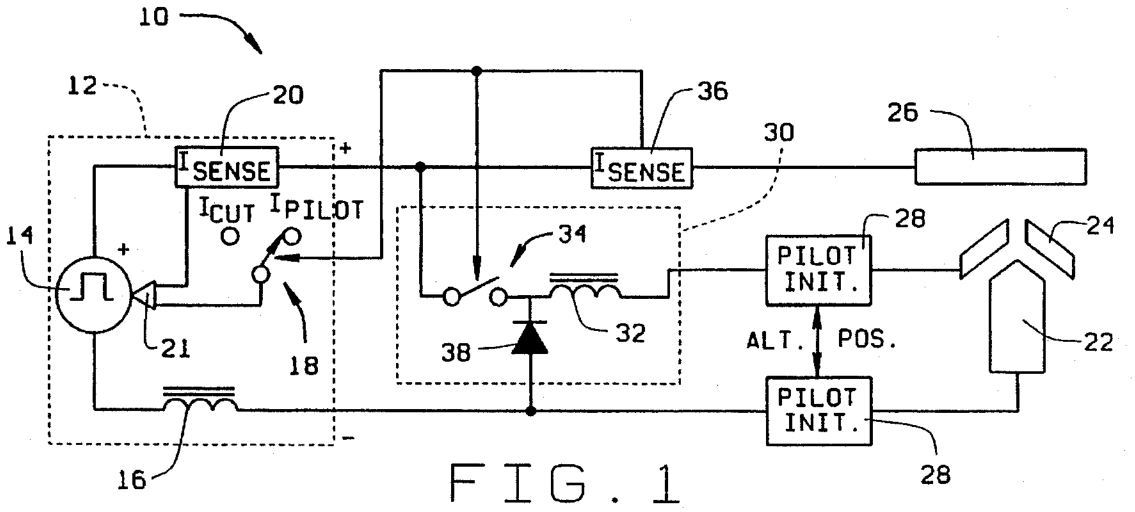
FIG. 1 PRIOR ART
FIG. 1 is a schematic wiring diagram of a prior art plasma arc torch operating circuit.

Referring to FIG. 1, there is shown a prior art electrical circuit for a plasma arc torch generally designated 10. It should be understood that circuit 10 is but one type of prior art plasma arc torch circuit, such circuit forming part of the subject matter of U.S. Pat. No. 5,170,030 to Solley et al. and assigned to the assignee of the present invention. Circuit 10 utilizes a single power source 12 to provide necessary current for the pilot arc between a torch electrode 22 and a pilot electrode or tip 24, and to provide necessary current for transfer and maintenance of an operating arc to between the torch electrode 22 and a workpiece 26.

The power source 12 includes a power generator 14 in series with an output inductor 16, and a current regulator portion consisting of current switch 18, current sensor 20, and comparator 21. The output current level of the power source 12 is switchable via switch 18 between a pilot current reference, $I_{pilot}$, and a cutting or operating current reference, $I_{cut}$. The current switch 18 is automatically controlled by a signal received from a current sensor 36 that detects whether current is flowing in a workpiece 26. The switch 18 switches between the two reference voltages $I_{pilot}$ and $I_{cut}$. The comparator 21 receives as an input the appropriate reference voltage ($I_{pilot}$ or $I_{cut}$) from the switch 18 and compares that signal with the voltage signal from the current sensor 20 indicative of the actual current of the circuit 10.

Coupled between the power source 12 and the pilot electrode 24 is a pilot arc regulator circuit designated 30. The pilot arc regulator includes a pilot inductor 32, a switch 34, and a diode 38. The switch 34 is coupled to the current sensor 36 for receiving a signal from the current sensor 36. A pilot initiator 28 is interposed between either the pilot electrode 24 and the pilot arc regulator circuit 30, or the torch electrode 22 and the power supply 12.

Upon start-up of the plasma torch, the current switch 18 is set for pilot current, $I_{pilot}$. The current switch 18 provides the reference voltage signal to a comparator 21 that is coupled to the power generator 14. This signal is compared with the signal from the current sensor 20 which is used to detect the circuit current. The current sensor 36 is utilized to actuate switch 34 to cut off the pilot current when low levels of current are detected in the workpiece 26 which occurs when the torch with the pilot arc is brought sufficiently close to the workpiece 26, thereby signaling the start of an operating arc. The current sensor 36 sends a signal to the switch 34 to open, causing cessation of the pilot current. The pilot current cessation causes the power source inductor 16 to create a voltage surge that appears between the torch electrode 22 and the workpiece 26, and is of sufficient magnitude to complete the operating arc.

At the same time that the switch 34 opens, the current sensor 36 sends a signal to the current switch 18 to switch from pilot current, $I_{pilot}$, to operating or cutting current, $I_{cut}$ to maintain the operating arc.

Figure 2:
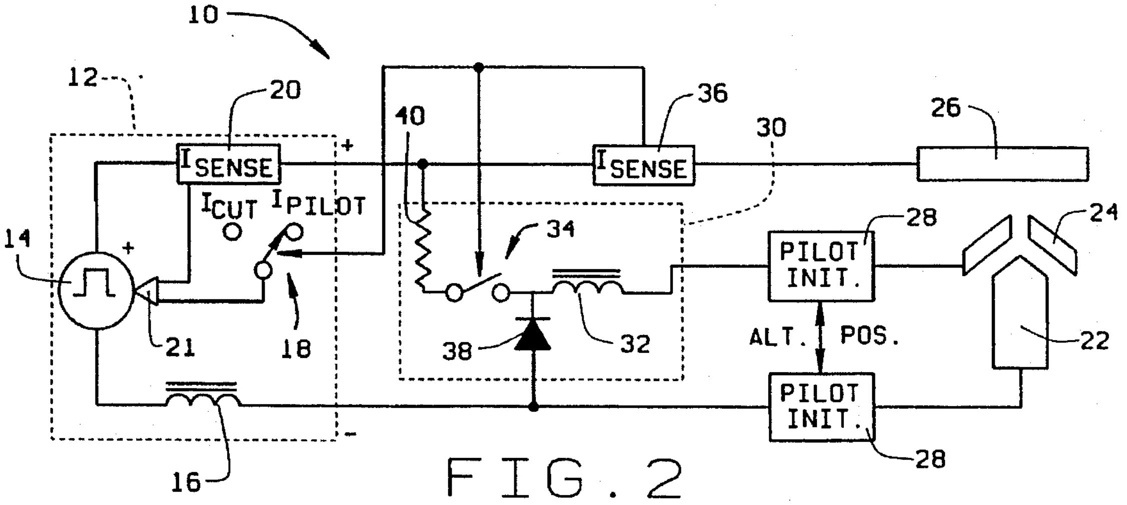
FIG. 2 PRIOR ART
FIG. 2 is a modified schematic wiring diagram of the prior art plasma arc torch operating circuit of FIG. 1.

The prior art circuit of FIG. 2 is identical in form, function, and manner of operation as the prior art circuit of FIG. 1, with the exception of the use of a resistor 40 in the pilot current regulator 30. The resistor 40 is coupled in series with the pilot electrode 24 to improve the standoff distance. This creates a greater voltage between the torch electrode 22 and the workpiece 26, assisting the standoff at transfer.

The two prior art circuits illustrated in FIGS. 1 and 2 have been utilized by the assignee of the present invention in plasma arc torches. The operation of the circuits is illustrative of typical prior art circuits for plasma arc torches. Other typical prior art circuits utilize separate power sources for the pilot arc and the operating arc.

However, regardless of the type of prior art plasma arc torch circuits utilized, the prior art circuits shut off the pilot current only after the operating arc is established. In this regard, the prior art plasma arc torch circuits are thus reactive to the current sensed in the workpiece.

Present Invention

Figure 3:
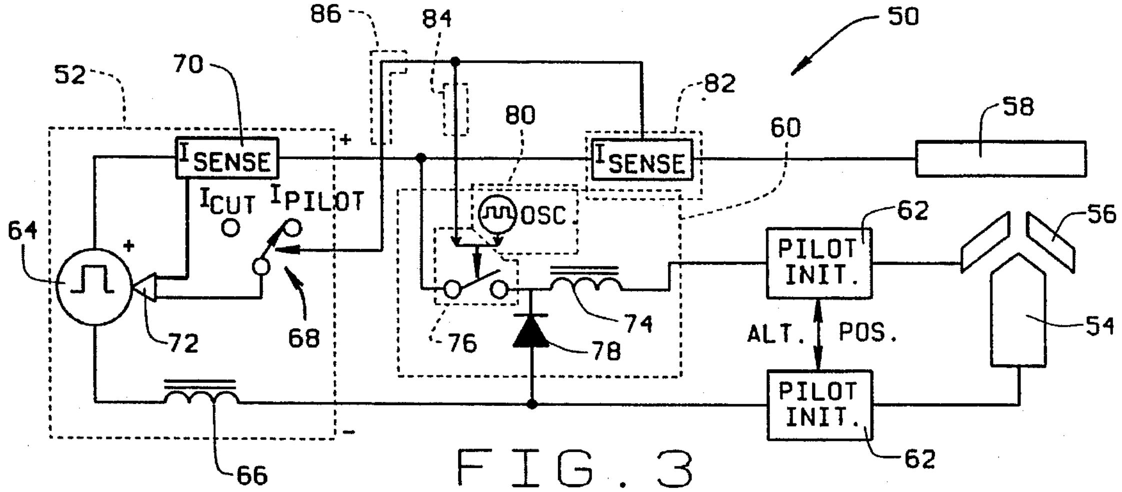
FIG. 3 is a schematic wiring diagram depicting a plasma arc torch operating circuit according to the principles of the present invention.

Referring now to FIG. 3, there is shown a block circuit diagram generally designated 50 in accordance with the present invention. Circuit 50 includes a power source 52 that is coupled to a torch electrode 54, a pilot electrode 56, and a workpiece 58. In its preferred form, power source 52 is a current regulated power source although it would be possible to utilize other types of power sources. Also, it should be noted that the present circuit 50 utilizes a single power source for supplying power to the electrodes 54, 56 and the workpiece 58 for both the pilot arc and the operating arc, rather than a separate power source for supplying power to the electrodes 54, 56 for the pilot arc, and a separate power source for supplying power to the torch electrode 54 and the workpiece 58 for the operating arc. However, one skilled in the art would recognize that separate power sources may be utilized and adapted accordingly to utilize the principles of the present invention.

The power source 52 includes a current regulated power supply 64 in series with an output inductor 66. The power supply 64 is regulated through a two-input comparator 72. A current sensor 70 that measures the current in the overall circuit is coupled to one input of the comparator 72. The current sensor 70 provides a signal to the comparator 72 indicative of the circuit current. A current switch 68 is coupled to the other input of the comparator 72. The current switch 68 sets the output current level of the power source 52 by a reference voltage signal associated with $I_{pilot}$ and $I_{cut}$. The output current of the power source 52 is switchable via current switch 68 between a pilot current, $I_{pilot}$, and a cutting or operating current, $I_{cut}$. The current switch 68 is automatically controlled by a signal received from a second current sensor 82 through circuit 86 that detects whether current is flowing in the workpiece 58. During start-up of the circuit 50, the current switch 68 is set for $I_{pilot}$, and the power source 52 provides the appropriate pilot current. The pilot current in the circuit 50 is monitored by the current sensor 70 that sends its signal to the comparator 72.

Although not shown, a pulsing circuit may be included in the power source 52 for pulsing the demand signal such that the power supplied to the pilot arc and/or the operating arc is pulsed.

A pilot initiation circuit 62 is coupled between the power source 52 and the torch electrode 54. The pilot initiation circuit 62 provides high frequency start-up energy for initiating the pilot arc between the torch electrode 54 and the pilot electrode 56. Alternatively, the pilot initiation circuit 62 may be coupled between the pilot arc regulator circuit 60 and the pilot electrode 56.

A pilot arc regulator circuit 60 is coupled between the power source 52 and the pilot electrode 56. The pilot arc regulator circuit 60 includes a pilot inductor 74 and a pilot regulator disconnect or switch 76 in series with the pilot electrode 56. A freewheeling diode 78 couples the pilot arc regulator circuit 60 to the torch electrode 54. At one end the diode 78 is coupled between the pilot inductor 74 and the pilot regulator disconnect 76, and at the other end the diode 78 is coupled between the power source 52 and the torch electrode 54. As explained more fully hereinbelow, when the power source is open-circuited from the pilot electrode, the diode 78 allows the transitory energy stored in the pilot inductor 74 to transitorily sustain the pilot arc.

The pilot inductor 74 is utilized by the present circuit 50 to provide a transitory sustaining current for the pilot arc during a time interval after the power source 52 has been open-circuited therefrom. Thus, any type of current source may be utilized, such as a separate current source, rather than an inductor.

The pilot regulator disconnect 76 is operable to open circuit a portion of the regulator circuit 60 upon receipt of a signal. The disconnect is coupled to and receives an input signal from the current sensor 82 via circuit 84 or an oscillator 80. The disconnect 76 may be a solid state type disconnect such as an IGBT, or another type. However, the disconnect 76 should be capable of rapid turn on and off in order to quickly reestablish the pilot current or maintain the absence of pilot current from the pilot electrode. Upon receipt of the input signal the pilot regulator disconnect 76 open-circuits the pilot electrode 56 relative to the power source 52.

The current sensor 82 is coupled to the workpiece 58 and generates a signal when small amounts of current flow are detected in the workpiece 58 indicative of arc transfer. In its preferred form, the current sensor 82 is a Hall effect sensor that generates the requisite signal after sensing a threshold level of current flow in the workpiece. The sensor 82 may be of another type, but should be fast enough to rapidly detect and generate the appropriate signal.

The oscillator 80 generates a periodic signal, the period of which is dependent upon circuit constraints, that periodically actuates the pilot regulator disconnect 76 to periodically open-circuit the pilot electrode 56 relative to the power source 52.

Operation

The operation of the present circuit will now be described. Reference should be made to FIG. 3. Upon power-up of the plasma torch apparatus, the power source 52 is set to provide a pilot current of a predetermined amperage, determined by the reference voltage $I_{pilot}$, by the current switch 68. The pilot current supplied by the power source 52 is monitored by the current sensor 70 that provides a signal to the comparator 72 indicative of the actual current in the circuit. The pilot current is caused to flow through the output inductor, as well as the pilot regulator circuit 60 that includes the disconnect 76 and the pilot inductor 74. Regardless of the placement of the pilot initiation circuit 62 a pilot arc is established between the pilot electrode 56 and the torch electrode 54.

After start-up of the plasma arc torch apparatus, the oscillator 80 begins to periodically provide a signal to the disconnect 76. The time interval that the oscillator 80 is "on" and provides an "open-circuit" signal to the disconnect 76 may vary, as well as the time interval that the oscillator 80 is "off" and the disconnect 76 receives a "closed-circuit" signal. Time intervals of from 1 to 11 μseconds have been used for the "open-circuit" signal. When the disconnect 76 receives an "open-circuit" signal from the oscillator 80, the disconnect 76 switches, and open-circuits the power source 52 from the pilot electrode 56. The cessation of current in the output inductor 66 causes a large voltage spike to appear between the workpiece and the torch electrode 54, on the order of 450 V for a typical plasma torch. This voltage is generally sufficient to provide a transfer of over ½". Once a small amount of current is detected in the workpiece 58, indicative of successful transfer, the current sensor 82 must quickly sense the operating current in the workpiece and provide a "current sensed" signal to the disconnect 76.

The "current sensed" signal from the current sensor 82 is received by the disconnect 76. The disconnect 76 then keeps the power source 52 open-circuited from the pilot electrode 56 in the case that disconnect 76 is still open. In the case that the disconnect 76 has received a closed signal from the oscillator 80, the disconnect 76 must quickly open-circuit the power source 52 from the pilot electrode 56. If the pilot current is not ceased, then the pilot arc will continue and the operating arc will extinguish. At the same time the disconnect 76 receives the "current sensed" signal from the current sensor 82, the current switch 68 also receives the signal and is set to $I_{cut}$. The power source 52 then outputs cutting or operating current. As with the pilot current, the cutting current is monitored by the current sensor 70.

If transfer does not occur as a result of the generated voltage spike in the output inductor 66, the disconnect 76 does not receive a signal from the current sensor 82 and the signal received from the oscillator 80 causes the disconnect 76 to close and allows the power source 52 to supply power to the pilot electrode 56. It should be noted that if the torch becomes close enough to the workpiece 58 at any time, transfer will occur and the disconnect 76 will open-circuit the power source 52 from the pilot electrode 56.

Optionally, during the 1 to 11 μsecond time interval that the power source 52 is open-circuited to the pilot electrode 56, the pilot arc previously established between the pilot electrode 56 and the torch electrode 54 may be maintained so that in the event the operating or cutting arc is not established, there is no need for a high frequency start-up. This is accomplished by the pilot inductor 74. However, it should be noted that any current source could be utilized. The stored energy in the pilot inductor 74 flows through the freewheeling diode 78 and around to the electrodes 54, 56.

It has been found that for maximum efficiency, the periodic signal from the oscillator 80 periodically actuates the disconnect 76 to open-circuit the power source for an interval that is shorter than a maximum capacity of the inductor to sustain the pilot arc while the power source 52 remains open-circuited.

The pilot arc and/or the operating arc may be pulsed. This provides advantages over non-pulsed arcs. In this regard, it has been found by the inventor, that in order to try and obtain the best possible chance of transfer occurring during the open-circuiting of the power source 52, the disconnect 76 must be open-circuited 1–4 times during a pilot current peak. This signal is thus provided by the oscillator 80.

Figure 4A:
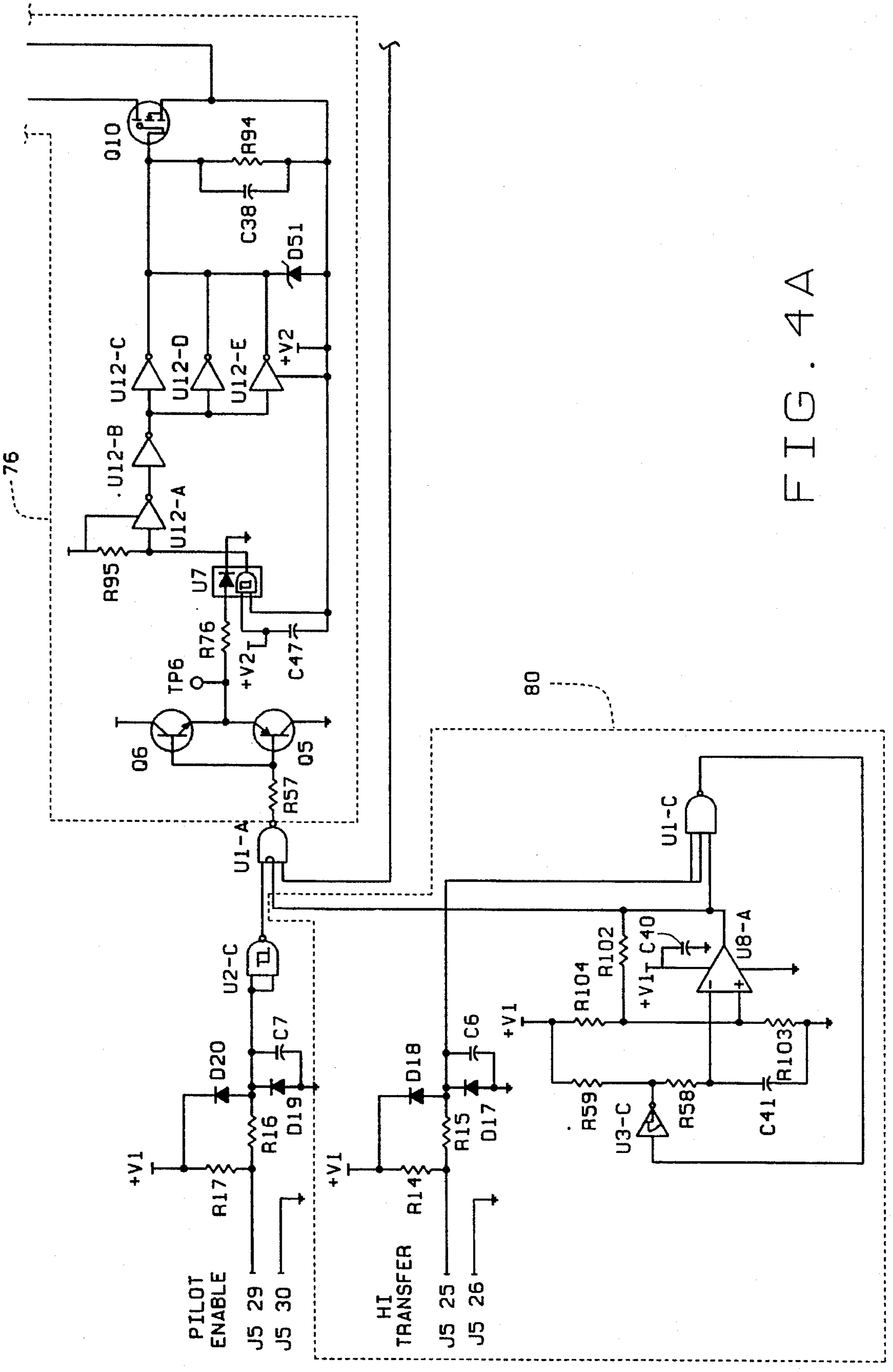
FIGS. 4A and 4B, in combination, are a more detailed component wiring diagram of the present invention.
Figure 4B:
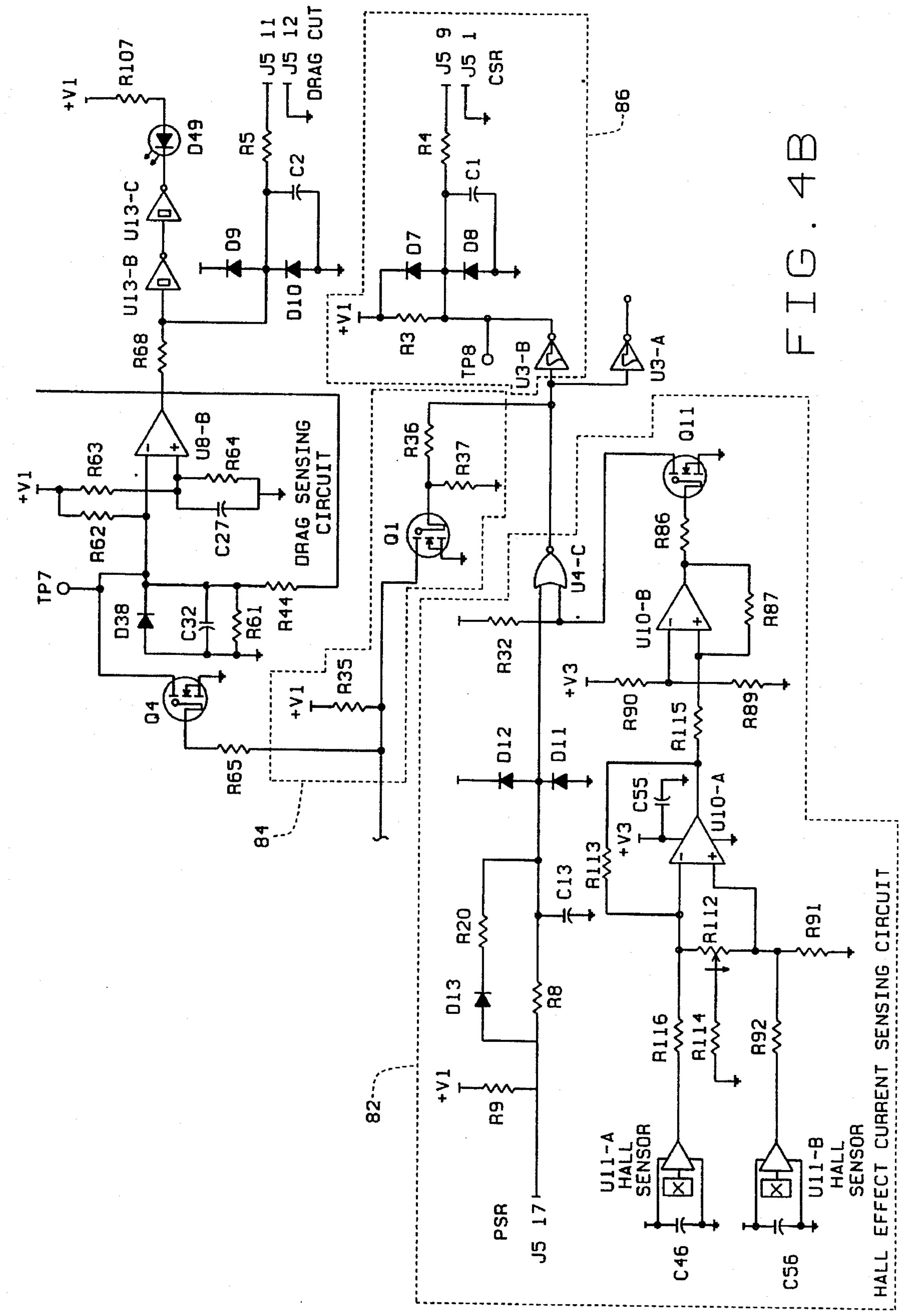

FIGS. 4A and 4B are more specific electronic circuit schematic diagrams depicting actual electrical components and their interconnections embodying some of the concepts of the invention as enumerated above. Like reference numerals appearing in FIGS. 4A and 4B refer to like circuit components or group of components appearing in FIG. 3. It should be noted that some of the components depicted in FIG. 3, such as the power supply, are not shown in FIGS. 4A and 4B. In FIG. 4B, the workpiece current sensor 82 is a Hall Effect current sensing circuit. As would be appreciated by one skilled in the art, the circuit components and the manner of interconnection of the various circuit components depicted in FIGS. 4A and 4B are not absolute, and thus may be modified accordingly without the modification departing from the concepts of the present invention.

Thus, while the foregoing is directed to the preferred embodiment of the present invention, other and further embodiments of the invention may be devised without departing from the basic scope thereof, with the scope thereof determined by the claims which follow.

What is claimed is:

1. An electronic circuit for a plasma arc torch to transfer an established pilot arc from between a pilot electrode and a torch electrode to between the torch electrode and a workpiece and to control pilot arc current flowing between the torch electrode and a pilot electrode so as to provide enhanced arc transfer, the electronic circuit comprising:

a power circuit coupled to the pilot electrode, the torch electrode, and the workpiece to supply power to the electrodes for the pilot arc, and to supply power to the torch electrode and the workpiece after transfer of the pilot arc, said power circuit including an output inductor;

a first circuit coupled between said power circuit and the pilot electrode, said first circuit including a pilot current disconnect operable to open-circuit said first circuit to cease current flow from said power circuit creating an induced voltage in said output inductor to aid in the transfer of the pilot arc from the torch electrode to the workpiece;

an oscillator circuit coupled to said pilot current disconnect to provide a periodic signal to said pilot current disconnect to periodically actuate said pilot current disconnect to periodically open-circuit said first circuit to attempt arc transfer; and a current sensor coupled between the workpiece and said power circuit to sense current flow in the workpiece, said current sensor providing a first signal to said pilot current disconnect when current is sensed in the workpiece to actuate said pilot current disconnect to either maintain said first circuit open-circuited or open-circuit said first circuit.

2. The circuit of claim 1, further comprising:

a second circuit coupled between said first circuit and the pilot electrode to control the conduction of current between the torch electrode and the pilot electrode.

3. The circuit of claim 1, wherein said power circuit further includes a pulser circuit to provide a pulsed demand signal to pulse the power for the pilot arc.

4. The circuit of claim 1, wherein said first circuit includes a pilot current source to provide a transitory sustaining pilot current to the pilot electrode when said first circuit is open-circuited.

5. The circuit of claim 4, wherein said periodic signal from said oscillator periodically actuates said pilot current disconnect to open-circuit said first circuit for an interval that is shorter than a maximum capacity of said pilot current source to sustain the pilot arc while said first circuit is open-circuited.

6. The circuit of claim 5, wherein said interval is between 1 and 11 μseconds.

7. An electronic circuit for a plasma arc torch to transfer a pilot arc from between a pilot electrode and a torch electrode to between the torch electrode and a workpiece to be operated upon after initiation of the pilot arc between the torch electrode and the pilot electrode, the electronic circuit comprising:

a single current regulated power source coupled to the pilot electrode, the torch electrode, and the workpiece, and adapted to provide power to the electrodes for the pilot arc, pilot arc transfer, and maintaining the transferred arc during operation on the workpiece, said single current regulated power source including an output inductor in series with the torch electrode;

a first circuit coupled between said power source and the pilot electrode, said first circuit including a pilot current disconnect operable to open-circuit said first circuit ceasing current flow from said power source to the pilot electrode and creating an induced voltage in said output inductor to initiate arc transfer;

an oscillator circuit coupled to said pilot current disconnect to provide a periodic signal of a predetermined interval to said pilot current disconnect to periodically actuate said pilot current disconnect to periodically actuate said pilot current disconnect to periodically open-circuit said first circuit for said predetermined interval to attempt arc transfer; and a current sensor coupled between the workpiece and said power source to sense current flow in the workpiece indicative of arc transfer, said current sensor providing a signal to said disconnect when current is sensed in the workpiece to either maintain said first circuit open-circuited when said first circuit is open-circuit or to open-circuit said first circuit.

8. The circuit of claim 7, wherein said first circuit includes a pilot current source to provide a transitory sustaining pilot current to the pilot electrode when said first circuit is open-circuited, and the electronic circuit further comprises a second circuit coupled between said first circuit and the torch electrode to allow conduction of said transitory sustaining pilot current to the pilot electrode.

9. The circuit of claim 7, wherein said predetermined interval of said periodic signal is 1 to 11 μseconds.

10. An electronic circuit for a plasma arc torch to initiate transfer of an arc to between a torch electrode and a workpiece from an established pilot arc between the torch electrode and a pilot electrode, the circuit comprising:

a power circuit coupled to the pilot electrode, the torch electrode, and the workpiece to supply power to the electrodes for the pilot arc, and to supply power to the torch electrode and the workpiece after transfer of the pilot arc;

a first circuit coupled between said power circuit and the pilot electrode, said first circuit including a pilot current disconnect operable to periodically open-circuit said first circuit to periodically cease current flow from said power circuit, and a pilot current source to provide a transitory sustaining pilot current to the pilot electrode during periods when said first circuit is open-circuited by said pilot current disconnect to transitorily maintain the pilot arc;

a current sensor coupled between the workpiece and said power source to sense current flow in the workpiece indicative of arc transfer, said current sensor providing a signal to said disconnect when current is sensed in the workpiece to either maintain said first circuit open-circuited when said first circuit is open-circuit or to open-circuit said first circuit; and a second circuit coupled between said first circuit and the torch electrode to allow conduction of said transitory sustaining pilot current to the pilot electrode.

11. The circuit of claim 10, wherein said pilot current source is an inductor.

12. A plasma torch apparatus adapted to operate on a workpiece, the plasma torch apparatus comprising:

a pilot electrode;

a main electrode;

a current regulated power circuit coupled to said pilot electrode, said main electrode, and the workpiece, said current regulated power circuit supplying power for pilot arc initiation, pilot arc transfer, and arc maintenance during operation on the workpiece, said current regulated power circuit including an output inductor;

a first circuit coupled between said current regulated power circuit and said pilot electrode, said first circuit including a pilot current disconnect operable to open-circuit said first circuit ceasing current flow from said power circuit to said pilot electrode and creating an induced voltage in said output inductor, and a pilot inductor;

an oscillator circuit coupled to said pilot current disconnect to provide a periodic signal thereto to actuate said pilot current disconnect to periodically open-circuit said first circuit, said pilot inductor providing a transitory sustaining pilot current to said pilot electrode when said first circuit is open-circuited;

a current sensor coupled between the workpiece and said power circuit to sense current flow in the workpiece, said current sensor providing a first signal to said pilot current disconnect when current is sensed in the workpiece to actuate said pilot current disconnect to either maintain said first circuit open-circuited or to open-circuit said first circuit; and a second circuit coupled between said first circuit and the torch electrode to allow conduction of said transitory sustaining pilot current to the pilot electrode.

13. The plasma torch apparatus of claim 12, wherein said periodic signal from said oscillator periodically actuates said pilot current disconnect to open-circuit said first circuit for an interval that is shorter than a maximum capacity of said pilot current source to sustain the pilot arc while said first circuit is open-circuited.

14. The plasma torch apparatus of claim 12, wherein said interval is between 1 and 11 μseconds.

15. The plasma torch apparatus of claim 12, wherein said power circuit further includes a pilot arc pulser to provide a pulsed demand signal to pulse the power for the pilot arc.

16. A method of transferring a pilot arc previously established between a pilot electrode and a torch electrode of a plasma arc torch to an operating arc between the torch electrode and a workpiece, the method comprising the steps of:

periodically ceasing the pilot current from a current source by an oscillator coupled to a disconnect circuit interposed between the pilot electrode and the current source circuit to cause an output inductor in the current source circuit to develop an induced voltage between the torch electrode and the workpiece to attempt to initiate arc transfer;

continuously sensing for current in the workpiece indicative of arc transfer by a current sensor coupled between the workpiece and the current source circuit; and providing a signal to the disconnect circuit when the current sensor senses current in the workpiece indicative of arc transfer to cause the disconnect to either maintain the cessation of pilot current or to cease the pilot current.

17. The method of claim 16, wherein the current is ceased for a 1 to 11 μsecond interval.

18. The method of claim 16, further comprising the step of providing a transitory current between the electrodes from a pilot current source in the disconnect circuit after the step of periodically ceasing the current flow, to sustain the pilot arc during current cessation.

* * * * *